US011556404B2

(12) United States Patent
Kothari et al.

(10) Patent No.: US 11,556,404 B2
(45) Date of Patent: Jan. 17, 2023

(54) SYSTEMS AND METHODS FOR PERFORMING A TECHNICAL RECOVERY IN A CLOUD ENVIRONMENT

(71) Applicant: Capital One Services, LLC, McLean, VA (US)

(72) Inventors: Ankit Kothari, Glen Allen, VA (US); Ann Hawkins, Midlothian, VA (US); John Samos, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 304 days.

(21) Appl. No.: 17/028,418

(22) Filed: Sep. 22, 2020

(65) Prior Publication Data

US 2022/0091947 A1 Mar. 24, 2022

(51) Int. Cl.
*G06F 11/00* (2006.01)
*G06F 11/20* (2006.01)
(Continued)

(52) U.S. Cl.
CPC ........ *G06F 11/008* (2013.01); *G06F 11/2023* (2013.01); *G06F 11/2048* (2013.01);
(Continued)

(58) Field of Classification Search
CPC ............... G06F 11/008; G06F 11/2023; G06F 11/2048; G06F 11/321; H04L 43/026
See application file for complete search history.

(56) References Cited

U.S. PATENT DOCUMENTS 8,020,037 B1 9/2011 Schwartz et al.
8,918,673 B1 * 12/2014 Rangaiah .............. G06F 11/008
714/4.11
(Continued)

OTHER PUBLICATIONS

Uila, "Application Dependency Mapping," available at https://www.uila.com/solutions/application-dependency-mapping?gclid=EAIaIQobChMIotPrv9SM6gIVBL3ICh2nowpYEAMYASAAEgK7SvD_BwE—accessed on Sep. 2, 2020.
(Continued)

*Primary Examiner* — Michael Maskulinski
(74) *Attorney, Agent, or Firm* — Bookoff McAndrews, PLLC

(57) ABSTRACT

A computer-implemented method for testing failover may include: determining one or more cross-regional dependencies and traffic flow of an application in a first region of a cloud environment, wherein the one or more cross-regional dependencies include a dependency of the application in the first region of the cloud environment to one or more applications in at least one other region of the cloud environment; determining a risk score associated with performing failover of the application to a second region of the cloud environment at least based on the determined one or more cross-regional dependencies and traffic flow of the application; comparing the determined risk score with a predetermined risk score; in response to determining that the determined risk score is lower than the predetermined risk score, performing failover of the application to the second region of the cloud environment; isolating the second region of the cloud environment from the first region of the cloud environment for a predetermined period of time; and monitoring operation of the application in the second region of the cloud environment during the predetermined period of time.

20 Claims, 6 Drawing Sheets

(51) Int. Cl.
*H04L 43/026* (2022.01)
*G06F 11/32* (2006.01)

(52) U.S. Cl.
CPC ...... *G06F 11/2092* (2013.01); *G06F 11/2094* (2013.01); *G06F 11/321* (2013.01); *H04L 43/026* (2013.01)

(56) References Cited

U.S. PATENT DOCUMENTS

| | | |
|---|---|---|
| 9,817,727 B2 | 11/2017 | McAlister et al. |
| 10,387,279 B2 | 8/2019 | Gadish et al. |
| 11,394,770 B1* | 7/2022 | Bello ................. H04L 67/1008 |
| 11,411,808 B2* | 8/2022 | MacCarthaigh .... G06F 11/2028 |
| 2015/0006949 A1* | 1/2015 | Bitties ................. G06F 11/2028 714/4.11 |
| 2018/0267830 A1* | 9/2018 | Rivera ................. G06F 9/5072 |
| 2019/0235970 A1* | 8/2019 | Mishra .................... G06F 3/067 |

OTHER PUBLICATIONS

Kephart, Nick, "Understanding and Monitoring Dependencies in Cloud Applications," DZone Performance Zone, Mar. 31, 2017, available at https://dzone.com/articles/understanding-and-monitoring-dependencies-in-cloud—accessed on Sep. 2, 2020.

* cited by examiner

SYSTEMS AND METHODS FOR PERFORMING A TECHNICAL RECOVERY IN A CLOUD ENVIRONMENT

TECHNICAL FIELD

Various embodiments of the present disclosure relate generally to technical recovery exercises, and, more particularly, to systems and methods for performing technical recovery exercises with technology utilizing a cloud environment.

BACKGROUND

Many types of services, programs, systems, and electronic applications (collectively referred hereto as "applications"), such as servers, storage, connectivity, e-commerce, etc., have been implemented in a cloud-computing environment. Such applications generally rely on consistent and continuous operation. To plan for, test, evaluate responses, etc., for incidents impacting operations of technological infrastructure, an entity may perform a technical recovery exercise. However, conventional recovery exercises may not be well adapted to issues associated with technology utilizing a cloud environment.

Technology utilizing a cloud environment may include multiple applications with interrelated dependencies that are unaccounted for by conventional recovery exercises. Traffic flow between different applications in the cloud may spread across multiple cloud regions, and may not be readily discernable. Additionally, conventional recovery techniques may not be comprehensive solutions for a production environment in the cloud. For example, a conventional recovery exercise may be unable to validate a failover of infrastructure operating in one cloud region to another cloud region.

As a result, in response to an actual incident in production, an application implemented in the cloud with conventional recovery techniques may encounter a high severity incident in which the application is unable to successfully failover. Additionally, during such an incident in production, it may not be possible, using conventional techniques, to identify application dependencies between different cloud regions without performing additional analysis after the incident is detected. This ex-post-facto analysis may increase the time needed to recover the application beyond a recovery time objective (RTO) and recovery point objective (RPO) according to service level agreements (SLA). The failure of such conventional failover processes may prevent customers from accessing the services otherwise provided.

The present disclosure is directed to addressing the above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for performing an extreme technical recovery exercise on a cloud infrastructure.

In one aspect, an exemplary embodiment of a computer-implemented method for testing failover may include: determining one or more cross-regional dependencies and traffic flow of an application in a first region of a cloud environment, wherein the one or more cross-regional dependencies include a dependency of the application in the first region of the cloud environment to one or more applications in at least one other region of the cloud environment; determining a risk score associated with performing failover of the application to a second region of the cloud environment at least based on the determined one or more cross-regional dependencies and traffic flow of the application; comparing the determined risk score with a predetermined risk score; in response to determining that the determined risk score is lower than the predetermined risk score, performing failover of the application to the second region of the cloud environment; isolating the second region of the cloud environment from the first region of the cloud environment for a predetermined period of time; and monitoring operation of the application in the second region of the cloud environment during the predetermined period of time.

In another aspect, an exemplary embodiment of a computer system for performing an extreme technical recovery exercise may include a data storage device storing processor-readable instructions and a processor operatively connected to the data storage device and configured to execute the instructions to perform operations. Such operations may include: determining one or more cross-regional dependencies and traffic flow of an application in a first region of a cloud environment, wherein the one or more cross-regional dependencies include a dependency of the application in the first region of the cloud environment to one or more applications in at least one other region of the cloud environment; determining a risk score associated with performing failover of the application to a second region of the cloud environment at least based on the determined one or more cross-regional dependencies and traffic flow of the application; comparing the determined risk score with a predetermined risk score; as a result of determining that the determined risk score is lower than the predetermined risk score, performing failover of the application to the second region of the cloud environment; isolating the second region of the cloud environment from the first region of the cloud environment for a predetermined period of time; and monitoring operation of the application in the second region of the cloud environment during the predetermined period of time.

In a further aspect, an exemplary embodiment of a computer-implemented method for testing failover may include: determining one or more cross-regional dependencies and traffic flow of an application in a first region of a cloud environment, wherein the one or more cross-regional dependencies include a dependency of the application in the first region of the cloud environment to one or more applications in at least one other region of the cloud environment; determining a risk score associated with performing failover of the application to a second region of the cloud environment at least based on the determined one or more cross-regional dependencies and traffic flow of the application; comparing the determined risk score with a predetermined risk score; in response to determining that the determined risk score is lower than the predetermined risk score, performing failover of the application to the second region of the cloud environment; displaying, via a user interface, information indicating progress of the failover of the application to the second region of the cloud environment; isolating the second region of the cloud environment from the first region of the cloud environment for a predetermined period of time; monitoring operation of the application in the second region of the cloud environment during the predetermined period of time; and displaying, via the user interface, information indicating the monitored operation of the application in the second region of the cloud environment during the predetermined period of time.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
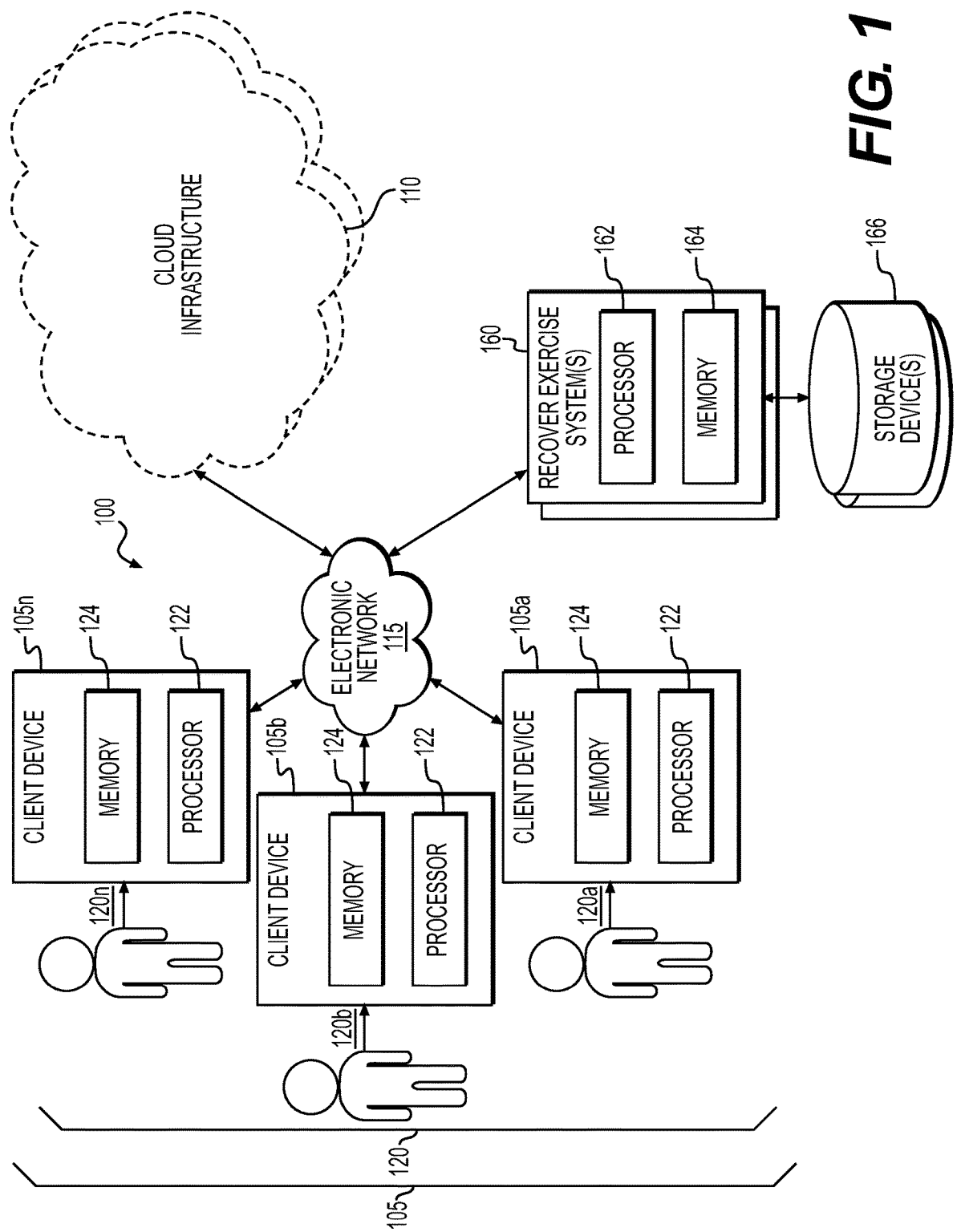
FIG. 1 depicts an exemplary embodiment of a computing environment according to the techniques and technologies presented herein.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

As used herein, terms such as "cloud," "cloud environment," "cloud infrastructure," or the like generally encompass a networked system of computing resources that together provide a computing environment. The computing environment provided by a cloud infrastructure may be virtualized, e.g., abstracted from physical computing hardware forming the cloud infrastructure. The term "cloud region" generally encompasses a predetermined geographical region and/or the cloud infrastructure resources physically located within the predetermined geographical region. The term "resources" generally encompasses computing systems such as server systems or the like, as well as data centers that include one or more server systems. Terms such as "application," "service," or the like generally encompass software programs, systems, electronic applications (e.g., "apps" and/or programs developed for use by an end user, or that implement or enable electronic interactions between entities such as businesses or the like), tools, services (e.g., programmatic or "headless" processes such as a Domain Name Server, Active Directory, etc.), or the like that are implemented and/or implementable using a cloud infrastructure, e.g., via a virtualized computing environment supported by cloud infrastructure resources. The resources supporting the virtualized environment for a particular application may be physically located in one or more cloud regions. Further, an application may depend on or communicate with another application, e.g., via an Application Programming Interface ("API"), and such links between applications may be internal or external to one or more cloud regions and/or the cloud as a whole. Terms such as "service provider," "host provider," or the like generally encompass an entity associated with providing a cloud infrastructure, a computing environment implemented on a cloud infrastructure, and/or cloud infrastructure resources. The term "failover" generally encompasses a migration of services, infrastructure, processing, storage, or the like for an application, system, operation, or the like from one set of resources to another, e.g., from one cloud region to another. The term "failback" generally encompasses a reversal, negation, rollback, reset, or the like of a failover.

Technology recovery exercises generally encompass procedures intended to test, evaluate, validate, etc., the impact of a failure of at least a portion of the technology infrastructure supporting operation of an entity. For a service provider, such operation generally includes providing a computing environment to one or more applications hosted via the provider's services. However, conventional technology recovery exercises may not be well adapted to technology infrastructure implemented on a cloud. Cloud infrastructure may provide features that are beneficial to and/or desirable by service providers. For example, having a plurality of cloud regions within a cloud infrastructure may provide geographical redundancy. In the event that one cloud region fails, e.g., due to a natural disaster, service interruption, power outage, or the like, or in the event that at least a portion of the resources within the cloud region are damaged or unable to support an application hosted in that cloud region, a service provider may desire that the application(s) hosted by that cloud region may safely failover to another region. Such failover procedures may be complex and/or difficult, however.

Thus, as entities begin to move more of their technology infrastructure to a cloud environment, there is a need for more advanced resiliency testing. Many entities may perform conventional basic technical recovery exercises or disaster recovery exercises on a regular basis to prove resiliency. However, such conventional exercises may not take into account how applications may have cross-region dependencies, and there may be no conventional way to sufficiently see the traffic flow for an application between different cloud regions. Further, conventional technical recovery exercises may not be comprehensive in a production environment. In other words, conventional exercises may not be equipped to isolate an entire cloud region and enable all applications in that cloud region to successfully failover to another region.

The lack of a sufficient solution for technical recovery exercises in the cloud environment may result in severe consequences when an actual incident occurs in production. Applications may run into a high severity incident in which the applications may be unable to failover successfully. Also, during an actual incident in production, there may not be a way to identify application dependencies between different cloud regions without ex-post-facto analysis. Therefore, it may take longer to recover an application within its RTO and RPO. When such application failover processes are unsuccessful, it may hinder customers from accessing online and mobile services provided by such entities.

However, implementing such a solution may be difficult due to the generally highly interdependent nature of cloud-based applications. For instance, it may be difficult to identify what resources or applications may be impacted by a service migration from one cloud region to another, or even to identify what applications need to be migrated in order to execute such a migration. Moreover, even if such information is known, executing a failover of a cloud region may be difficult or complicated to execute, and similarly may be difficult or complicated to validate, e.g., verify that the migrated application(s) are functioning properly with all dependencies intact. Accordingly, improvements in technology relating to an autonomous customer experience are needed.

In the following description, embodiments will be described with reference to the accompanying drawings. As will be discussed in more detail below, in various embodiments, systems and methods for performing technical recovery exercises with technology utilizing a cloud environment are described. It should be understood that while several embodiments of this disclosure describe technology recovery exercises, the systems and method disclosed herein may be adapted to other uses such as, for example, implementing a failover of a portion of a cloud infrastructure, or any other use familiar to one of ordinary skill in the art.

Disclosed below are various features and embodiments for a system and method to perform extreme technical recovery exercise in a cloud environment. In some embodiments, such an exercise may include moving all production applications in one cloud region to another cloud region in the production environment in a systematic, organized, risk-averse manner. In some embodiments, cross-region application dependencies for each application are identified and mitigated to reduce a potential negative impact to any applications' stability. Additionally, connectivity between the cloud regions may be completely isolated to facilitate cross-region monitoring to verify that the applications can sustain operations in just one (e.g., only one single) cloud region.

FIG. 1 depicts an exemplary embodiment of a computing environment 100 that may be utilized with the techniques and technologies presented herein. The computing environment 100 may include one or more client device(s) 105, including client devices 105a-105n, and one or more cloud infrastructure(s) 110, which may communicate across an electronic network 115. The systems and devices of FIG. 1 may communicate in any arrangement. As will be discussed herein, systems and/or devices of the computing environment 100 may communicate in order to provide cloud services to the client device 105, and/or perform technology recovery exercises on the cloud infrastructure 110.

The client device 105 may be a computer system such as, for example, a desktop computer, a mobile device, etc. In an exemplary embodiment, the client device 105 is a cellphone, or the like. Each client device 105 may be associated with a respective user 120, such as one of users 120a-120n, and generally includes a processor 122 and memory 124. In some embodiments, the client device 105 may include an electronic application installed on the memory 124 of the client device 105. In some embodiments, the electronic application is associated with an application hosted on the cloud infrastructure 110.

Figure 2:
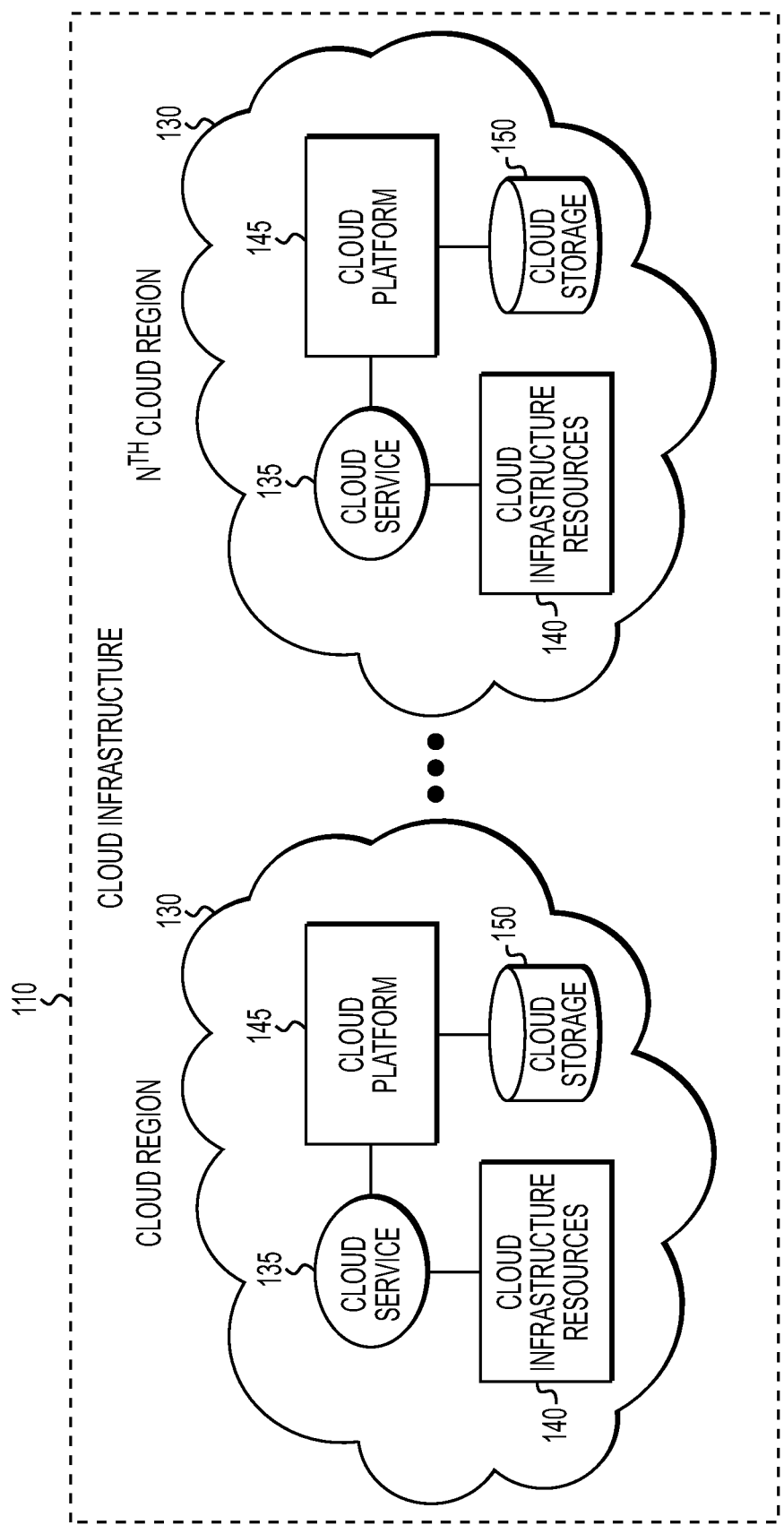
FIG. 2 depicts a cloud infrastructure, according to one or more embodiments.

As depicted in FIG. 2, the cloud infrastructure 110 may include one or more cloud regions 130. Each cloud region 130 may include, for example, a cloud service module 135, cloud infrastructure resources 140, a cloud platform 145, and a cloud storage 150. The service module 135 may be, for example, an event handler or queue configured to manage communications and requests to and from the cloud region 130. The cloud infrastructure resources 140 may include, for example, one or more server systems, data centers, or the like. The cloud platform 145 may include, for example, a front-end or interface accessible via the electronic network 115 (FIG. 1). The cloud storage 150 may include, for example, computer readable memory accessible to the other components of the cloud region 130.

As noted above, in some embodiments, the client device 105 (FIG. 1) may include an electronic application installed on the memory 124 of the client device 105. In some embodiments, the electronic application is associated with an application or service hosted on the cloud infrastructure 110. For example, the client device 105 may include an electronic application such as a web browser, a mobile application, a thin client, a terminal emulator, or the like, that is used to access an application, service, platform, or the like hosted by the cloud infrastructure 110. The cloud infrastructure 110 may host, for example, (i) a system-as-a-service such as a customer-relationship management system, an email server or handler, a virtual desktop server, a communications server, or the like, (ii) a platform-as-a-service such as an execution runtime platform, a database or memory storage platform, a webserver, web or application development tools, or the like, and/or (iii) infrastructure-as-a-service such as a virtual machine, server, storage device, load balancer, network, or the like, or combinations thereof.

Returning to FIG. 1, in various embodiments, the electronic network 115 may be a wide area network ("WAN"), a local area network ("LAN"), personal area network ("PAN"), or the like. In some embodiments, electronic network 115 may include the Internet, and information and data provided between various systems occurs online. "Online" may mean connecting to or accessing source data or information from a location remote from other devices or networks coupled to the internet. Alternatively, "online" may refer to connecting or accessing an electronic network (wired or wireless) via a mobile communications network or device. The Internet is a worldwide system of computer networks—a network of networks in which a party at one computer or other device connected to the network can obtain information from any other computer and communicate with parties of other computers or devices. The most widely used part of the Internet is the World Wide Web (often-abbreviated "WWW" or called "the Web").

The computing environment 100 may further include one or more recovery exercise system(s) 160 that is configured to perform one or more technology recovery exercise with the cloud infrastructure 110, as discussed in further detail below. The recovery exercise system 160 may include, for example, a processor 162, and a memory 164. The memory 164 may store instructions implemented as one or more modules, as discussed in further detail below. The recovery exercise system 160 may include and/or be in communication with a storage device 166.

Although depicted as separate components in FIG. 1, it should be understood that a component or portion of a component may, in some embodiments, be integrated with or incorporated into one or more other components. For example, a portion of the cloud infrastructure 110 may be provided to or accessible by the client device 105 as an electronic portal via the electronic application, or vice versa. A portion of the recovery exercise system 160 may be included in and/or implemented by one or more cloud infrastructure resources 140 of the cloud infrastructure 110, or vice versa. A user device 105 may act as a resource utilized by the cloud infrastructure 110. Any suitable arrangement of the various systems and devices of the computing environment 100 may be used.

Figure 3:
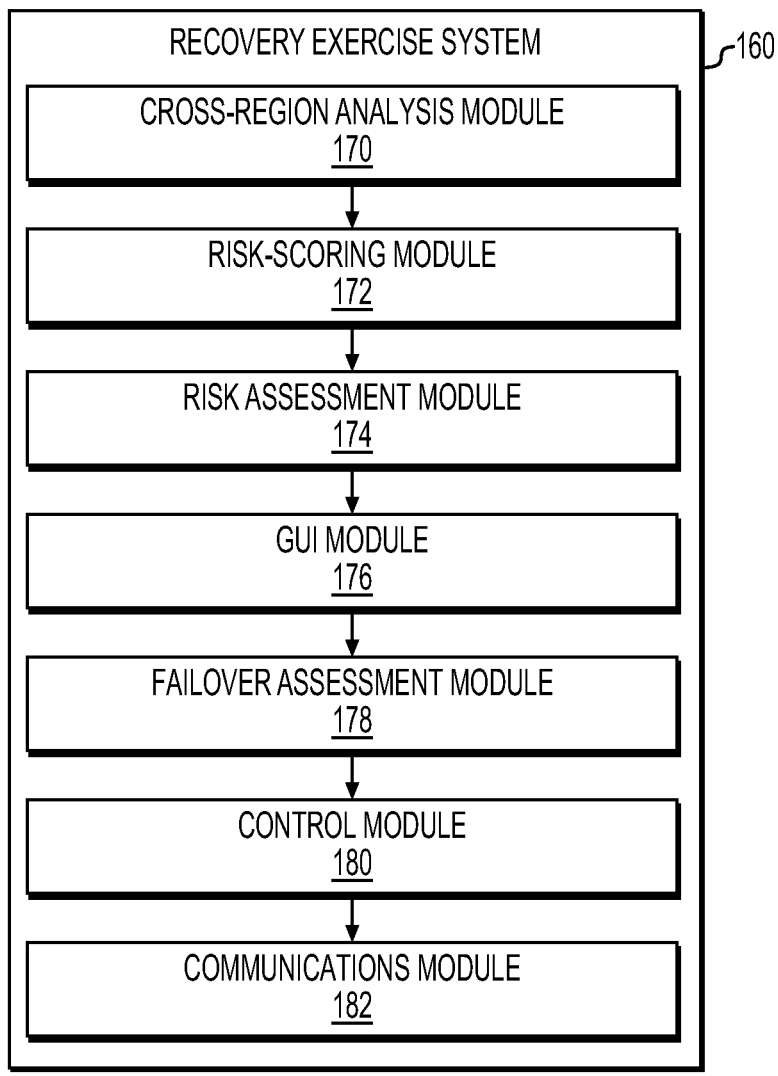
FIG. 3 depicts a functional block diagram of a recovery exercise system, according to one or more embodiments.

FIG. 3 depicts an exemplary functional block diagram of the recovery exercise system 160. As used herein, a functional block or "module" generally encompasses hardware and/or software used to implement instructions for operating a computing system. A module may access, use, and/or communicate with other modules, components of the system, and/or other systems. It should be understood that the modules discussed herein are illustrative only, actions described as associated with one module in some embodiments may, in other embodiments, be associated with another module, a plurality of modules, or no module. Acts described as being performed by a particular model for illustrative purposes may be understood to be performed by the processor implementing such module. Further, while the recovery exercise system 160 has been described and depicted as a single computing system that includes various modules, it should be understood that any suitable implementation of the recovery exercise system 160 may be used, including, for example, a distributed system that may include a plurality of computing devices. Different modules may be implemented on different computing devices of the system, or a single module may be distributed over multiple computing devices.

As depicted in FIG. 3, the recovery exercise system 160 may include a cross-region analysis module 170, a risk-scoring module 172, a risk assessment module 174, a Graphical User Interface ("GUI") module 176, a failover assessment module 178, a control module 180, and a communications module 182. The cross-region analysis module 170 is configured to identify cross-region dependencies and cross-region traffic flow for an application hosted by the cloud infrastructure 110. The risk-scoring module 172 is configured to assign a resiliency and risk score to the application. The risk assessment module 174 is configured to make an execution recommendation for performance of a technology recovery exercise. The GUI module is configured to provide graphical tools, information, and controls to a user of the recovery exercise system 160. The failover assessment module 178 is configured to track, record, and assess aspects of a recovery exercise and/or failover event. The control module 180 is configured to implement various instructions such as a failover event, permissions, and/or other aspects of a recovery exercise. The communications module 182 is configured to manage communications between modules, systems, and users. Each of these modules will be discussed in further detail below.

Figure 4:
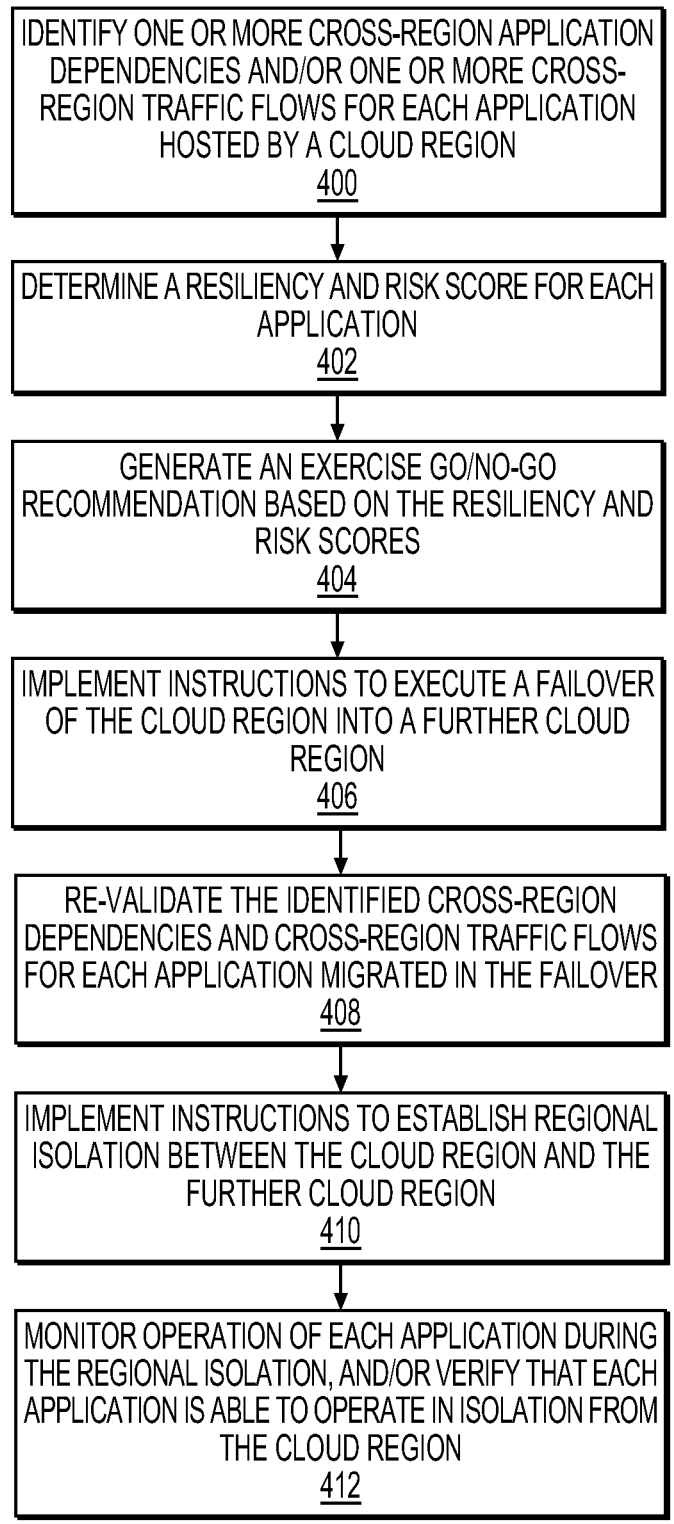
FIG. 4 depicts a flowchart of an exemplary method for operating a recovery exercise system, according to one or more embodiments.

FIG. 4 depicts an exemplary method for operating a recovery exercise system, such as the recovery exercise system 160. At step 400, the cross-region analysis module 170 may identify one or more cross-region application dependencies and/or one or more cross-region traffic flows for each application hosted by a cloud region 130. In some embodiments, such identification may include resolving one or more cross-region traffic issues and/or identifying or mitigating one or more cross-region dependencies, such as a dependency identified as or determined to be critical to a functionality of an application or service.

At step 402, the risk-scoring module 172 may determine a resiliency and risk score for each application. At step 404, the risk assessment module 174 may generate an exercise go/no-go recommendation based on the resiliency and risk scores. At step 406, the control module 180 may implement instructions to execute a failover of the cloud region 130 into a further cloud region. At step 408, the failover assessment module 178 may re-validate the identified cross-region dependencies and cross-region traffic flows for each application migrated in the failover. In some embodiments, such re-validation may include resolving the one or more cross-region traffic issues and/or identifying or mitigating the one or more cross-region dependencies.

At step 410, the control module 180 may implement instructions to establish regional isolation between the cloud region 130 and the further cloud region. In some embodiments, the regional isolation may be maintained for at least a predetermined period of time. At step 412, the failover assessment module 178 may monitor operation of each application during the regional isolation, and/or verify that each application is able to operate in isolation from the cloud region 130. Each of these steps will be discussed in further detail below.

In an exemplary use case, an electronic application used by a client device 105 may include, for example, an electronic banking application. Operation of the electronic banking application on the client device 105 may be dependent on a multitude of different applications hosted in and out of the cloud infrastructure 110. For example, the electronic banking application may include a login screen served by an authentication application implemented on the cloud infrastructure 110. The authentication application may depend on a display application on the cloud infrastructure 110 to generate graphics for the client device 105, or may depend on an application or service not hosted in the cloud infrastructure 110 such as a 2-factor authentication device, etc. For the electronic application on the client device 105 to successfully operate in the event that the cloud region 130 hosting, for example the authentication application, becomes unavailable, not only must the authentication application successfully failover to another cloud region, but also so too must each of the other applications with dependencies associated with the authentication application.

Figure 5:
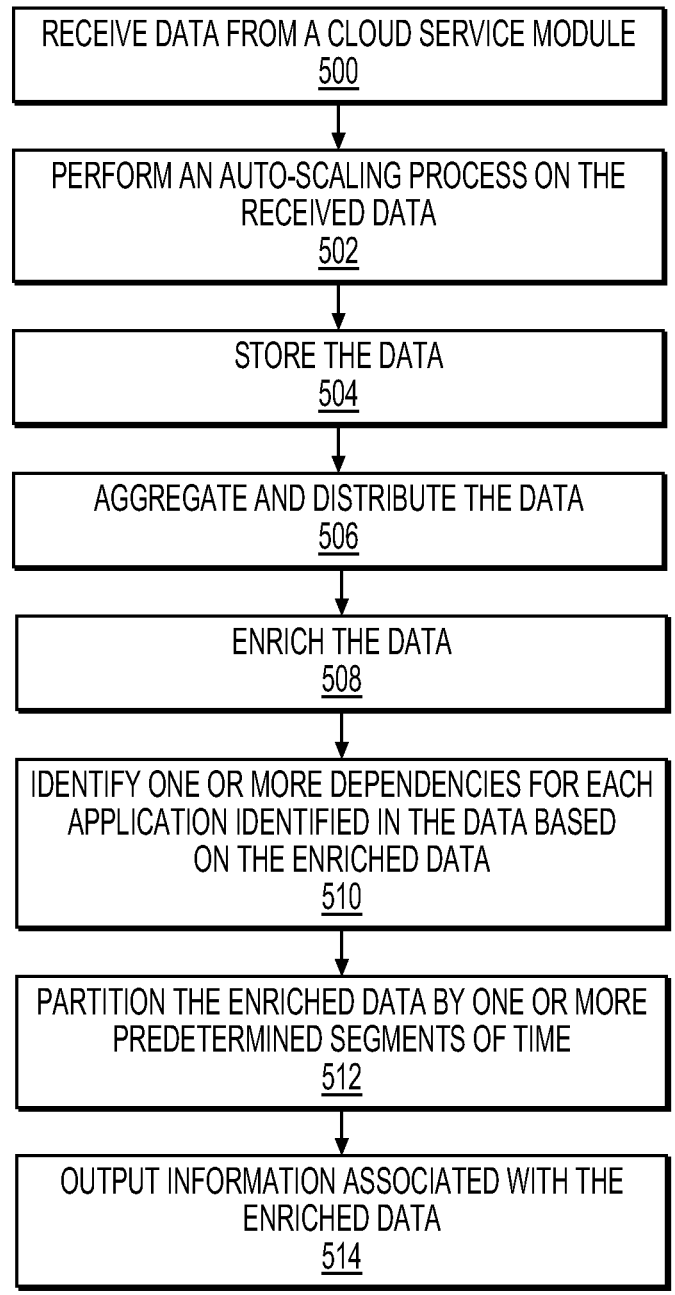
FIG. 5 depicts a flowchart of an exemplary method for identifying cross-region dependencies and/or cross-region traffic flow in a cloud infrastructure, according to one or more embodiments.

FIG. 5 depicts an exemplary method for identifying one or more cross-region application dependencies and/or one or more cross-region traffic flows for each application hosted by a cloud region 130 (step 400 of FIG. 4). The recovery exercise system 160 may, for example, implement this method via the cross-region analysis module 170. At step 500, the system 160 may receive data from the cloud service module 135 (FIG. 2). Such data may include, for example, data logs, e.g., raw data logs from the cloud region 130. Such data may be received periodically, automatically, in response to a request or instruction, or the like.

At step 502, the recovery exercise system 160 may perform an auto-scaling process on the received data. At step 504, the recovery exercise system 160 may store the data, e.g., the scaled data, in the memory 164 and/or the storage device 166. In some embodiments, the data may be stored in a staging directory of the recovery exercise system 160. At step 506, the recovery exercise system 160 may aggregate and distribute the data. Such aggregation and distribution may include, for example, parsing the data and distributing the data into individual files respectively associated with each application, service, cloud account, etc., in the cloud region 130.

At step 508, the recovery exercise system 160 may enrich the data by, for example, adding information associated with each application, service, account, etc., to the corresponding file. In some embodiments, connections between IP addresses and applications, services, accounts, etc., may be determined, as discussed in more detail below, and the enriching may be performed based on the determined connections. In some embodiments, the recovery exercise system 160 may enrich the data by adding additional location information to each file such as, for example, non-cloud data center information associated with an application, service, account, etc.

At step 510, the recovery exercise system 160 may identify one or more dependencies for each application based on the enriched data. In some embodiments, the identification may be based on traffic flow data from the enriched data. At step 512, the recovery exercise system 160 may partition the enriched data by one or more predetermined segments of time, e.g., by year, month, day, etc.

At step 514, the recovery exercise system 160 may output, e.g., via the GUI module 176 and/or the communications module 182, information associated with the enriched data. In various embodiments, such information may include one or more of: (i) a visual depiction of dependencies between applications such as dependencies between backend and client applications; (ii) application dependencies in conjunction with the information added during the enrichment of the data, whereby the application dependencies are categorized and/or separated into tiers based on resiliency, e.g., based on the resiliency and risk scores; (iii) traffic flows for application identified as having traffic flowing between production and non-production environments, or between cloud and non-cloud environments; or (iv) traffic flows for each application between different cloud regions 130. In some embodiments, such information may be displayed via one or more dashboards, as discussed in further detail below.

While a conventional recovery exercise technique may include leveraging cloud service logs, e.g., Virtual Private Cloud ("VPC") logs, which generally only contain basic fields such as IP addresses, the method above enriches such logs based on data from one or more data sources such as, for example, audit analytics, operations analytics, advertising analytics, cost and usage analytics, storage analytics such as S3 data event analytics. As a result, the enriched data may include one or more additional fields such as application name, source and/or destination region, resource type (e.g., EC2, ELB, or ALB), API service name, or the like.

In other words, in some embodiments, the method above takes one or more raw data sets from the above-mentioned data sources, and combines and enriches them to enable and simplify analysis, and/or provide direct and programmatic access to the enriched data. Employment of the GUI module 176, by the cross-region analysis module 170, may enable the recovery exercise system 160 to provide a GUI configured to allow one or more users to view one or more predefined dashboards that may include at least a portion of the enriched data related to cross-region application dependencies and cross-region traffic flows for any of the applications in the cloud infrastructure 110. For example, in some embodiments, a user may input an application name into the GUI, and in response, the GUI may display application specific cross-region dashboards.

One or more dashboards that may be included in the GUI include, but are not limited to: a A 'VPC peering traffic dashboard', which shows VPC to VPC peer connections; a 'Blast radius dashboard', which shows impacted applications due to cloud region failure; an 'on-premises dependencies dashboard', which displays on-premises dependencies (e.g., dependencies within a data center or the like), and may also display source and destination IP address details; a 'Cross environment backend dependencies dashboard', which shows if an application is sending traffic across different environments such as from production to non-production, etc., and may also display information indicative of anomalies in communications or traffic; a 'Cross environment client dependencies dashboard', which shows if an application is receiving traffic across different environments, and may also display information indicative of anomalies in communications or traffic; a 'Cross region application dependencies by LOB dashboard', which displays application dependencies by Lines of Business within an entity, and which may show cross-region application to application traffic and/or cross region application to S3 direct traffic; an 'Application dependencies by resiliency tier dashboard', which displays the resiliency tier of applications that an application is dependent upon, whereby in some embodiments, resiliency tier is indicative of an application criticality within the entity as defined internally within the entity; an 'Application resiliency view—Traffic and Resources distribution dashboard', which displays information indicative of a traffic distribution across the cloud regions, and/or information usable to perform active analysis or determine a count of each resource type by cloud region for an application such as total number of EC2 instances in a cloud region, etc.

In some embodiments, the cross-region analysis module 170 may be configured to perform a self-service function that includes identifying and listing downstream dependent applications that an application may communicate with, and/or upstream applications which may depend on the application. The self-service function may also identify which upstream and/or downstream application may be communicating cross-regionally in the cloud infrastructure 110, and/or that may have a potential to cause issues in the event that the cloud region 130 becomes unavailable.

In some embodiments, the cross-region analysis module 170 may be configured to perform a notification function, e.g., in conjunction with the communications module 182. The notification function may include alerting a user or person associated with an application, e.g., via email, text, or chat alerts or the like, of the identified cross-regional application dependencies and/or cross-region traffic flows for that application. In some embodiments, the notification function may include determining that an application is identified as critical, is associated with a higher resilience tier, or the like that may be indicative that the application includes cross-region dependencies that may cause issues if the cloud region 130 becomes unavailable. The notification function may further include generating a critical severity incident on an incident system (e.g., a system used to track incidents and/or assign technician(s) for resolution).

In an exemplary use case, a user of an application team using one or more of the above-mentioned self-service cross-region dashboards of the cross-region analysis module 170 may be able to proactively identify any cross-region application dependencies and traffic flows for an application, and is facilitated to take an appropriate action to mitigate the cross-region traffic issues and/or the cross-region dependencies, which otherwise may potentially cause application issues if one of the cloud regions 130 which hosts any of the dependencies suddenly becomes unavailable.

With regard to step 402, in some embodiments, the risk-scoring module 172 may determine the resiliency and risk scores for each application by employing a risk model that is configured to evaluate a plurality of risk factors. In some embodiments, the risk scoring model may be predetermined, e.g., may include one or more predetermined weights or scores for each risk factor that may be used to determine the resiliency and risk score of an application. In some embodiments, the scores are determined as a weighted average of scores for the risk factors included in the model. In some embodiments, the risk-scoring module may employ an algorithm or the like to determine the scores.

Risk factors that may be included in the model include, but are not limited to: application's cross-region dependencies, current resiliency abilities and deficiencies, resiliency tier showing application's importance, customer impact potential, previous history of severity incidents caused by an application, application's dependency on other lower or higher tier applications, application's change frequency, application's participation in previous technical recovery exercises and their resiliency success rate, application's resiliency results from its last technical recovery exercise where it participated, etc. Risk factors that may not include information for a particular application, e.g., an application that was not subject to any previous exercises, may be omitted, initialized with a default score, assigned a lower weight, etc.

In some embodiments, applications may be assigned a level or tier of risk based on the score for that application. In some embodiments, information associated with the resiliency and risk scores may be displayed in a dashboard in the manner discussed above. For example, in some embodiments, information associated with the resiliency and risk scores may be displayed in a 'Potential risk dashboard', which shows a list of applications ranked based on the tiers and/or scores. In some embodiments, the 'Potential risk dashboard' may be configured to enable a user to filter the applications and/or scores by a LOB. In some embodiments, the 'Potential risk dashboard' may be configured to list all applications relevant to and/or participating in the exercise.

In some embodiments, the risk-scoring model may include a machine learning model. As used herein, a "machine learning model" includes data, instructions, algorithms, and/or other information together forming a machine that, once trained using a set of training data and a set of ground truths associated with the set of training data, is configured to output a result when provided with a given input. In an exemplary embodiment, the machine learning model may be trained to determine one or more weights for one or more risk factors. For example, training data may include predetermined information associated with one or more risk factors for an application, and a corresponding ground truth may include a predetermined resilience and risk score for that application. In some embodiments, instead of or in addition to determining the one or more weights, the machine learning model may also be configured to determine the scores. In some embodiments, the information associated with the one or more risk factors for the application also includes information associated with a criticality or tier of the application, dependencies associated with the application, or other related information.

In some embodiments, the GUI includes an 'Executive View' dashboard, which shows one or more graphs or visual graphics depicting the resiliency and risk scores for each LOB. In some embodiments, the GUI is configured to receive a selection of a particular graph or visual graphic from a user, and in response display information associated with the LOB such as, for example, divisions and/or subdivisions within the LOB. In some embodiments, the GUI is configured to receive a request from the user to export, transmit, save, etc., at least a portion of the information displayed by the GUI.

In some embodiments, the GUI and/or one or more of the dashboards displayed by the GUI may be updated periodically, in response to a request such as from a user or a system, or continuously in real-time.

With regard to step 404 of FIG. 4, the risk assessment module 174 may generate the exercise go/no-go recommendation based on the resiliency and risk scores. Any suitable process may be used to generate the go/no-go recommendation. In some embodiments, generating the go/no-go recommendation includes determining a sum, average, or the like of the resiliency and risk scores, and comparing the result with one or more predetermined thresholds. For example, a result below a first threshold may result in a "low risk" recommendation, a result above the first threshold but below a second threshold may result in a "medium risk" recommendation, and so forth. In some embodiments, the scores are weighted, e.g., based on the criticality, rank, and/or tier of each application. In some embodiments, generating the recommendation includes selecting and/or determining a level of risk from a predetermined set of risk levels. In some embodiments, one or more levels of risk may be selected/determined, and/or one or more recommendations may be generated for different types of risk, e.g., a high severity incident, an incident that may interrupt a LOB, an incident that interrupts all operations on a particular cloud region 130, etc.

In some embodiments, the risk assessment module 174 may generate the exercise go/no-go recommendation by employing a further machine learning model. For example, the further machine learning model may be trained to generate the recommendation as an output when provided with at least the resiliency and risk scores for the one or more applications hosted on the cloud region 130 that is to be subjected to the exercise. The further machine learning model may be trained, for example, with predetermined sets of resiliency and risk scores and/or risk factor information for a set of applications hosted by the cloud region 130 as training data, and corresponding predetermined go/no-go recommendations as ground truth. The training data may be generated manually, e.g., via a user, and/or may be generated based on results from a previous exercise.

In an exemplary use case, the machine learning model may determine that performing a failover exercise on the cloud region 130 presents a high risk of a high severity incident during an extreme technical recovery exercise, and in response may generate a "No-go" recommendation indicating that the exercise may be highly risky and/or that the exercise should not be performed. In another exemplary use case, the machine learning model may determine that performing a failover exercise on the cloud region 130 presents a medium risk of a high severity incident during an extreme technical recovery exercise, and in response may generate a "Go with caution" recommendation indicating that the exercise may be performed with caution, e.g., with monitoring as discussed in more detail below. In a further exemplary use case, the machine learning model may determine that performing a failover exercise on the cloud region 130 presents a low risk of a high severity incident during an extreme technical recovery exercise, and in response may generate a "Go" recommendation indicating that the exercise may be performed.

In some embodiments, the risk assessment module 174 may operate in conjunction with the GUI module 176 to display information associated with an assessment of the risk in performing the exercise to a user. In some embodiments, the GUI may include a 'Solution homepage dashboard', that indicates one or more recommendations generated by the risk assessment module 174.

In some embodiments, the risk assessment module 174 may be configured to receive manual risk assessment information in addition to or instead of the information from the risk scoring module 172, e.g., via a "Leadership Approval' dashboard. In some embodiments, access to one or more dashboards, e.g., the Leadership Approval dashboard may be restricted, e.g., require a user authentication or login.

In some embodiments, the cloud region 130 includes multiple zones, divisions, sub-regions, etc., that each include a portion of the cloud infrastructure resources 140 supporting the cloud region 130. Each division may include one or more users associated with oversight of that division, e.g., a Divisional Chief Information Officer ("DCIO"). In some embodiments, the GUI may be configured to receive input from each DCIO as to whether that DCIO approves the exercise to be performed. In other words, each DCIO may view information from the GUI, and may determine whether their division is prepared for performance of the exercise. In some embodiments, the risk assessment module 174 may be configured to halt and/or prevent performance of the exercise in response to a negative input by one or more of the DCIOs. In some embodiments, a single negative response results in halting the exercise. In some embodiments, a threshold number of negative responses may be required. In some embodiments, inputs from different divisions may be weighted, ranked, and/or separated into tiers, and the exercise may be halted in response to a predetermined criteria.

In response to enacting a halt on the preparation and/or performance of the exercise, the risk assessment module 174 may be configured to perform one or more acts, e.g., in conjunction with the communications module 182, such as: transmit a communication to each DCIO and/or other persons associated with the exercise indicating the halt; cancel operation of any scripts, processes, and/or automated jobs associated with the exercise, transmit a communication to each application in the cloud region 130 indicating the halt; or the like. In some embodiments, the acts may be configured such that connectivity between the different cloud regions 130 remains un-isolated, e.g., intact. In some embodiments, in response to all the DCIOs or their assigned proxy individuals changing their decision to a 'Go' for conducting the extreme technical recovery exercise, then the risk assessment module 174 may remove the halt and reactivate any acts, jobs, or scripts associated with conducting the extreme technical recovery exercise.

In some embodiments, the risk assessment module 174 may be configured to provide the DCIOs a predefined period of time to provide input. In some embodiments, the risk assessment module 174 may be configured to default to a negative input in response to no input received within the period of time. In some embodiments, the risk assessment module 174 may cause a reminder message to be transmitted to each DCIO that fails to provide an input, e.g., at regular intervals, and may default to a negative input after a predetermined number of intervals without receiving an input.

With regard to step 406, the control module 180 may implement instructions to execute a failover of the cloud region 130 into a further cloud region. In some embodiments, the control module 180 may operate in conjunction with the GUI module 176 in order to, for example, receive instructions associated with preparing for, initiating, and/or executing the exercise. In some embodiments, the GUI may include a "Failover Exercise" dashboard, which may show one or more of all participating applications' failover status, failover region location of each application after completion of failover, or other associated failover details such as failover start time, failover end time, failover result, database replication frequency (if applicable), failover notes, business validation result status, etc. In some embodiments, such information may be manually entered, and/or automatically stored, e.g., in the cloud storage 150, the memory 164 of the recovery exercise system 160, and/or the storage device 166.

During a failover, an application participating in the technical recovery exercise may failover completely from one region 130 in the cloud infrastructure 110 to another region using one or more of manual steps, automated scripts, etc. A complete failover of an application demonstrates that the application is geo-resilient without depending on hardware or software resources in the previous cloud region 130.

In some embodiments, the control module 180 may be configured to determine at least a portion of the information associated with the exercise such as, but not limited to: actual RTO and/or RPO values for each application participating in the exercise, whereby actual RTO is a duration of the exercise, e.g. a difference between the failover end time and failover start time of the application during the technical recovery exercise, and actual RPO is a time difference between a last database or data backup and a time at which an incident, e.g., the exercise, started.

In some embodiments, the control module 180 may be configured to determine a failover result based on a comparison between the actual RTO and a predefined RTO, and/or between the actual RPO and a predetermined RPO. In some embodiments, in response to determining that the actual RPO and actual RTO are less than or equal to the respective predetermined values, the control module 180 may be configured to determine that the failover exercise was successful. In some embodiments, in response to one of the actual RTO or the RPO being greater than the respective predetermined values, the control module 180 may be configured to determine that the failover exercise was a failure. In some embodiments, the GUI may be configured to receive criteria defining one or more of a success or failure of the exercise, e.g., a user may input a criterion that an exercise is determined to be a success even though the actual RPO was greater than the predetermined RPO, e.g., as long as the actual RTO value is less than or equal to the predetermined RTO. Any suitable criteria may be used.

In some embodiments, an application may not include a database and/or may not require a backup, whereby the actual and predefined RPO value may not be a valid value and/or may not be indicative of an actual risk of data loss for the application. In some embodiments, the recovery exercise system 160 may be configured to identify such an application based on the enriched data for the application. In some embodiments, the GUI may be configured to receive input from a user defining one or more variables to be evaluated along with and/or instead of determining whether the failover exercise was successful.

As noted above, the control module 180 may be configured to receive instructions pertaining to preparing for and/or performing the exercise. In some embodiments, the control module 180 may be configured to perform one or more acts in response to an automated trigger condition being satisfied. For example, in some embodiments, a failover of a particular application may satisfy an automated trigger condition resulting in performance of one or more acts by the control module 180. Such acts may include, but are not limited to: identifying a start time of the technical recovery exercise, e.g., by polling a technical recovery exercise API; triggering a failover of the application to an alternate cloud region at the identified start time; identifying an end time of the exercise, e.g., by polling the technical recovery exercise API; triggering a failback of the application to the cloud region 130 at the identified end time, etc. The technical recovery exercise API may be configured to return one or more variables in response to being polled such as, but not limited to: a True/False technical recovery exercise start flag; the technical recovery exercise start time, the technical recovery exercise end time, etc.

In some embodiments, the control module 180 may be configured to apply a health check process associated with an application in order to identify a problem with the application and/or a network or associated cloud region 130. In some embodiments, the control module 180 may be configured to trigger a failover and/or failback of the application in response to a result of the health check process. In some embodiments, the control module 180 may be configured to identify whether one or more cloud regions 130 are isolated and/or unable to communication with one or more other cloud regions 130 during the exercise, and in response to such identification may trigger failover of the application to another cloud region 130. In some embodiments, the control module 180 is configured to trigger a script or process of the application in order to execute the failover and/or failback.

In some embodiments, the GUI may be configured to receive a "one-click" instruction to execute a failover of an application, and the control module 180 may be configured to execute the failover of the application in response to the one-click instruction. As used herein, a "one-click" instruction generally encompasses a manual instruction that may be entered and/or selected by a user via a single input command, e.g., no more than one click, button press, option selection, etc. In some embodiments, executing the failover of the application in response to the one-click instruction may include executing one or more predetermined instructions, e.g., a script, automated process, or the like. For example, one or more scripts may be configured to failover one or more components such as a database, server instance, etc., associated with the application from the cloud region 130 to another cloud region. In some embodiments, in response to receiving the one-click failover instruction via the GUI, the control module 180 may be configured to determine whether a new component, e.g., a new server, database, etc., needs to be activated in the other cloud region in order to implement the failover, and/or identify data that may need to be synchronized between various cloud regions 130. In some embodiments, the one-click failover instruction may be restricted to one or more applications, to one or more users, or the like. In some embodiments, the GUI may be configured to receive a "one-click" instruction to execute a failback of an application, and the control module 180 may be configured to execute the failback of the application in response to the one-click instruction, e.g., a reverse of the failover of the application as discussed above.

With regard to step 408, the failover assessment module 178 may re-validate the identified cross-region dependencies and cross-region traffic flows for each application migrated in the failover. In some embodiments, the failover assessment module 178 may perform monitoring of one or more of the application during and/or after the performance of the failover. As discussed in further detail below, monitoring performed during the failover may be employed in order to evaluate, interrupt, and/or revert the failover. In some embodiments, after an application has completed failover from the cloud region 130 to an alternate cloud region, the cross-region analysis module 170 may be employed in a similar manner as described above in order to verify that the migrated application is not associated with any cross-region dependencies and/or critical cross-region traffic flows from the previous cloud region 130 to the alternate cloud region.

In some embodiments, the GUI may include one or more monitoring dashboards that may show a real-time status of one or more applications, one or more cloud regions 130, and/or the cloud infrastructure 110. In some embodiments, the failover assessment module 178 may be configured to employ the communications module 182 in order to transmit an alert indicative of any incidents or issues identified by the failover assessment module 178 to one or more users, e.g., a support team or the like. In some embodiments, the one or more monitoring dashboards may include information associated with customer impact. For example, the failover assessment module 178 may be configured to determine, e.g., in real time, a potential customer impact due to one or more identified incidents or issues. In some embodiments, the impact may be identified and/or displayed in terms of high, medium, low, etc., on a predetermined scale, or the like.

In some embodiments, the GUI may include an application status dashboard that shows a visual indication of a status of each application, e.g., a green colored indication indicative of an operational or nominal status, a yellow colored indication indicative of one or relatively minor (e.g., non-critical) issues or incidents, and a red colored indication indicative of one or more critical issues or incidents. In some embodiments, application information displayed in the application status dashboard may be sorted based on the statuses of the applications, e.g., applications with the most critical issues at the top, or the like. In some embodiments, the application information is segmented into tiers based on the visual indication of the statuses, and each tier is sorted based on the resiliency and risk tiers for each application.

Similar to the application status dashboard, the GUI may include a network status dashboard to display a status of each available and/or isolated network, cloud region 130, datacenter, or the like. In some embodiments, the network status dashboard may show information associated with traffic passing between cloud regions 130, networks, datacenters, or the like.

In some embodiments, the failover assessment module 178 may be configured to halt and/or pause the failover of an application and/or performance of the exercise. In some embodiments, the failover assessment module 178 may be configured to compare the issues, incidents, and/or customer impacts identified for the applications with one or more predetermined thresholds. In some embodiments, issues, incidents, and/or customer impacts may be weighted based on, for example severity, impact, magnitude, or the like. In response to the identified issues, incidents, and/or customer impacts exceeding the one or more predetermined thresholds, the failover assessment module 178 may be configured to generate a recommendation to pause and/or stop the failover and/or exercise. In some embodiments, the failover assessment module 178 may be configured to automatically revert a failover, and/or un-isolate the cloud region 130, as discussed in further detail below.

In some embodiments, the GUI may be configured to receive an override command, and the failover assessment module 178 may be configured to resume the failover and/or exercise, e.g., by overriding the pause and/or halt, in response to receiving the override command. In some embodiments, access to the override command may be restricted in a manner similar to the restrictions discussed above.

In some embodiments, the failover assessment module 178 may be configured to store information associated with the identified issues, incidents, and/or customer impacts, e.g., in the memory 164 or storage device 166. In some embodiments, the GUI may include a reporting dashboard that shows information associated with the identified issues, incidents, and/or customer impacts, e.g., a count of applications participating in the exercise and/or one or more historical exercises, resiliency testing results for the applications, and/or failover results from the historical exercises.

With regard to step 410, the control module 180 may implement instructions to establish regional isolation between the cloud region 130 and the further cloud region. In some embodiments, the GUI is configured to receive an instruction to isolate a cloud region 130, and the control module 180 is configured to implement the instructions to isolate the cloud region 130 in response to such instruction. In some embodiments, the instruction to isolate the cloud region 130 is restricted, such as in a manner similar to restrictions discussed above. In some embodiments, isolation of a cloud region 130 includes isolation from one or more of at least one other cloud region 130, at least one data center, or the like. In some embodiments, the control module 180 is configured to isolate a data center, a group of cloud regions 130, or any other grouping or subgrouping of cloud resources 140. In some embodiments, the control module is configured to maintain an isolation for a predetermined period of time, e.g., a period of time sufficient to demonstrate that an application is able to successfully operate without any dependency on the isolated component(s), region(s), etc. In some embodiments, the instructions executed by the control module 180 to implement an isolation include one or more scripts, processes, or the like. In some embodiments, the GUI is configured to receive instructions to implement one or more of the scripts, processes, etc. The one or more scripts, processes, etc., may include, for example: a script configured to disable peering between the cloud region 130 to be isolated and other cloud regions such that any connectivity between VPCs is severed; a script configured to disable cloud proxy services in the cloud region 130 such that connectivity for any application or service using the proxy services to communicate with a service or application on the cloud region 130 is severed; a script configured to shut down one or more ports between various switches and/or services in one or more cloud resources. In some embodiments, the control module 180 may be configured to initiate an isolation in a variety of different ways, e.g., based on different instructions received via the GUI. In some embodiments, the GUI may be configured to receive a predetermined start time for an isolation, and the control module 180 may be configured to implement the isolation based on the received predetermined start time. In some embodiments, the control module 180 is configured to implement and/or revert the isolation if and only if the control module 180 has received, e.g., via the GUI, approval(s) from a predetermined one or more users, e.g., DCIOs or the like.

In some embodiments, the control module 180 is configured to transmit, e.g., via the communications module 182, an alert (e.g., a page, a text, an email, or the like) to a user (e.g., a support team, a user associated with an application affected by the isolation, etc.) indicative of the isolation. In some embodiments, the control module 180 is configured to transmit an alert indicative of an end to the exercise and/or the isolation. In some embodiments, the control module 180 may be configured to transmit such alerts automatically in response to initiation and/or cessation of an isolation.

In some embodiments, in conjunction with transmitting an alert, the control module 180 may be configured to poll the technical recovery exercise API. For example, the control module 180 may poll the technical recovery exercise API to determine if the technical recovery exercise start flag has been set to 'True' and/or to retrieve the start time. In some embodiments, the control module 180 may transmit the alert indicative of the isolation in response to the technical recovery exercise start flag being set to 'True'.

In some embodiments, the control module 180 may be configured to track times and destinations for transmitted alerts. In some embodiments, the control module 180 may be configured to track whether a recipient of an alert has received and/or acknowledged such alert. In some embodiments, the control module 180 may be configured to omit sending an alert to a recipient in response to the recipient having acknowledged a similar alert within a predetermined period of time. In some embodiments, in response to a lack of acknowledgement of an alert, the control module 180 may be configured to transmit a further alert a predetermined period of time after the transmission of a previous unacknowledged alert. In some embodiments, the control module 180 may be configured to initiate and/or revert an isolation in response to a "one-click" instruction. In some embodiments, the "one-click" isolate/un-isolate instruction may be restricted similar to the restrictions discussed above.

With regard to step 412, the failover assessment module 178 may monitor operation of each application during the regional isolation, and/or verify that each application is able to operate in isolation from the cloud region 130. Once the cloud region 130 becomes isolated, e.g., in the manner discussed above, any applications that failed-over to another cloud region may demonstrate that they are functioning properly and/or that they are not associated with any dependencies on the isolated cloud region 130.

In some embodiments an application hosted in the cloud infrastructure 110 may include a monitoring function configured to detect whether the cloud region 130 hosting the application is isolated, and/or is unavailable. In some embodiments, such an application may be configured to trigger a dynamic failover of the application in response to such detection. In some embodiments, information associated with such a dynamic failover, e.g., start time, end time, database replication or backup frequency, etc., may be entered or stored into the system 160, e.g., by a user associated with the application and/or via an automated process. In some embodiments, the failover assessment module 178 may include a Cloud Failover Details Intake API. In some embodiments, other systems and/or applications may poll the Cloud Failover Details Intake API to store information such as the foregoing with the system 160.

It should be understood that while methods and systems have been discussed herein as relating to an extreme technical recovery exercise for applications in a production environment, such systems and methods may alternatively or additionally be used to conduct technical recovery exercise for applications in non-production environments. It should also be understood that the words 'extreme technical recovery exercise', 'technical recovery exercise', 'resiliency exercise' or 'recovery exercise' generally encompass a similar concept of a technical recovery exercise that allows applications to verify their resiliency and recovery capabilities.

Further aspects of the disclosure are discussed in the additional embodiments below. It should be understood that embodiments in this disclosure are exemplary only, and that other embodiments may include various combinations of features from other embodiments, as well as additional or fewer features.

In an exemplary embodiment, a recovery exercise system is configured to autonomously perform an extreme recovery exercise, e.g., by implementing the modules and/or processes discussed above. In another exemplary embodiment, a recovery exercise system is configured to receive an instruction to perform an extreme recovery exercise and, in response to receiving the instruction, autonomously perform the extreme recovery exercise. In some embodiments, the instruction includes approval from one or more users.

In an exemplary embodiment, a recovery exercise system is configured to enrich VPC log data by retrieving information from one or more data sets, in order to provide context for transmission listed in the log data, e.g., sender, receiver, content, time, etc. In an exemplary embodiment, a recovery exercise system includes a GUI configured to display information associated with a recovery exercise, e.g., statistics, start time, end time, criticality and/or risk of applications, progress of the exercise, etc. In some embodiments, the system employs an API to poll information to be displayed on the GUI. In some embodiments, the exercise is configured to determine whether one or more applications hosted by a cloud infrastructure is geo-resilient, e.g., is resilient to failure of a cloud region hosting the application.

In some embodiments, errors or issues detected for an application during an exercise include reports from a monitoring process or application associated with the application. In some embodiments, errors or issues detected for an application during an exercise include reports from users of the application. In some embodiments, errors or issues detected for an application during an exercise include results from the system monitoring identified risk factors associated with the application.

In general, any process discussed in this disclosure that is understood to be computer-implementable, such as the processes illustrated in FIGS. 4 and 5, may be performed by one or more processors of a computer system, such as computer system 160, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as the system 160, may include one or more computing devices. One or more processors of a computer system may be included in a single computing device or distributed among a plurality of computing devices. The memory 164 of the computer system 160 may include the respective memory of each computing device of the plurality of computing devices.

Figure 6:
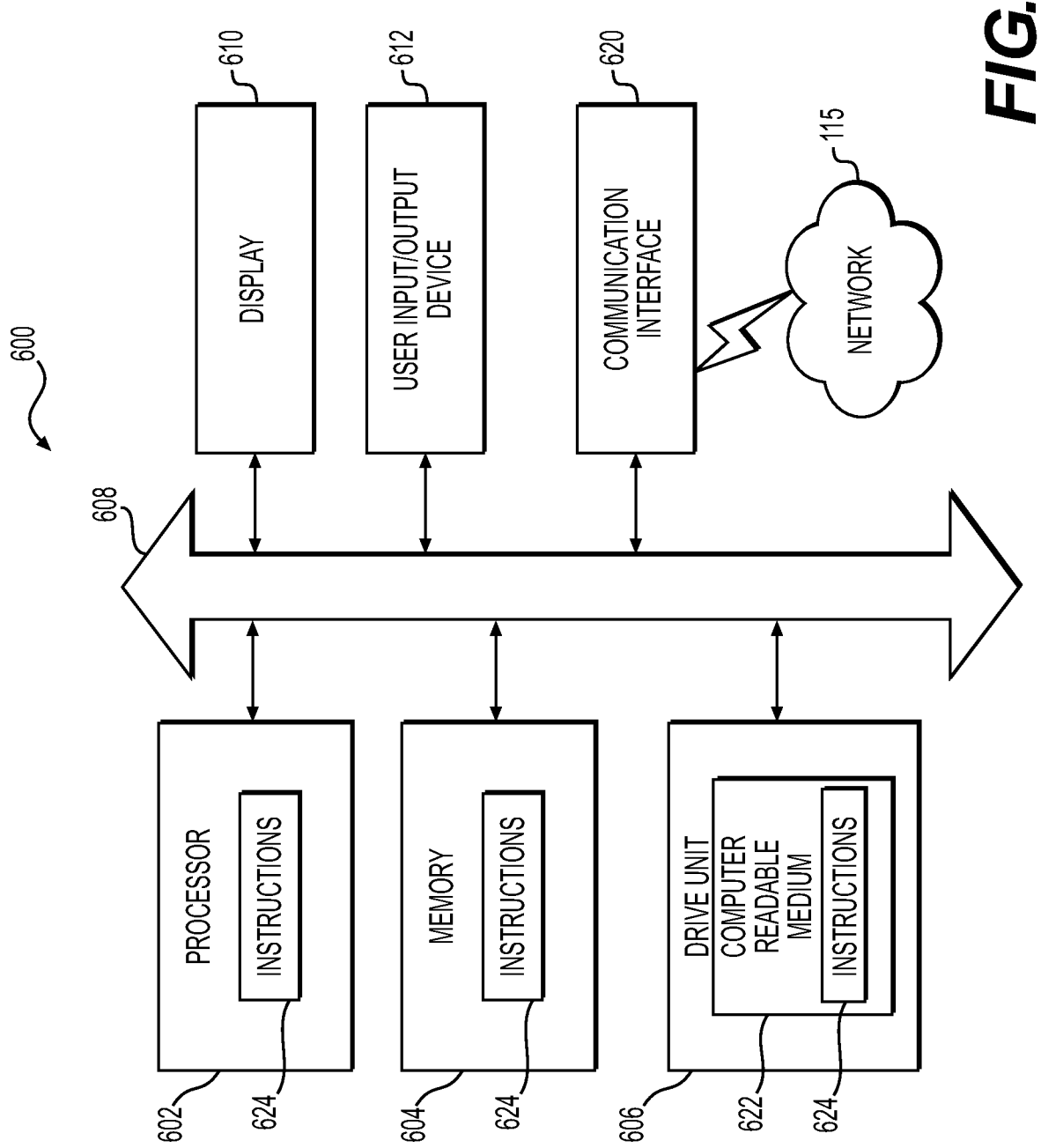
FIG. 6 depicts an example of a computing device, according to one or more embodiments.

FIG. 6 is a simplified functional block diagram of a computer 600 that may be configured as a device for executing the methods of FIGS. 4 and 5, according to exemplary embodiments of the present disclosure. FIG. 6 is a simplified functional block diagram of a computer that may be configured as the system 160 according to exemplary embodiments of the present disclosure. In various embodiments, any of the systems herein may be an assembly of hardware 600 including, for example, a data communication interface 620 for packet data communication. The computer also may include a central processing unit ("CPU") 602, in the form of one or more processors, for executing program instructions. The computer may include an internal communication bus 608, and a storage unit 606 (such as ROM, HDD, SDD, etc.) that may store data on a computer readable medium 622, although the system 600 may receive programming and data via network communications. The computer may also have a memory 604 (such as RAM) storing instructions 624 for executing techniques presented herein, although the instructions 624 may be stored temporarily or permanently within other modules of system 600 (e.g., processor 602 and/or computer readable medium 622). The computer also may include input and output ports 612 and/or a display 610 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the presently disclosed methods, devices, and systems are described with exemplary reference to transmitting data, it should be appreciated that the presently disclosed embodiments may be applicable to any environment, such as a desktop or laptop computer, an automobile entertainment system, a home entertainment system, etc. Also, the presently disclosed embodiments may be applicable to any type of Internet protocol.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A computer-implemented method for testing failover comprising:
   determining one or more cross-regional dependencies and traffic flow of an application in a first region of a cloud environment, wherein the one or more cross-regional dependencies include a dependency of the application in the first region of the cloud environment to one or more applications in at least one other region of the cloud environment;
   determining a risk score associated with performing failover of the application to a second region of the cloud environment at least based on the determined one or more cross-regional dependencies and traffic flow of the application;
   comparing the determined risk score with a predetermined risk score;
   in response to determining that the determined risk score is lower than the predetermined risk score, performing failover of the application to the second region of the cloud environment;
   isolating the second region of the cloud environment from the first region of the cloud environment for a predetermined period of time; and
   monitoring operation of the application in the second region of the cloud environment during the predetermined period of time.

2. The computer-implemented method of claim 1, wherein performing failover of the application to the second region of the cloud environment includes:
   establishing the determined one or more cross-regional dependencies and traffic flow of the application in the second region of the cloud environment.

3. The computer-implemented method of claim 1, wherein monitoring operation of the application in the second region of the cloud environment includes:
   determining whether the application is dependent on resources provided by regions of the cloud environment other than the second region of the cloud environment.

4. The computer-implemented method of claim 1, wherein performing failover of the application to the second region of the cloud environment includes:
   displaying, via a user interface, information indicating progress of the failover of the application to the second region of the cloud environment.

5. The computer-implemented method of claim 4, wherein performing failover of the application to the second region of the cloud environment further includes:
   determining a start time based on a time of initiation of the failover of the application to the second region of the cloud environment;
   determining a time of completion of the failover of the application to the second region of the cloud environment;
   determine a duration of the failover based on the start time and the time of completion; and
   displaying the duration via the user interface.

6. The computer-implemented method of claim 4, wherein performing failover of the application to the second region of the cloud environment further includes:
   determining data loss based on a state of the application prior to failover of the application to the second region of the cloud environment and a state of the application after failover of the application to the second region of the cloud environment; and
   displaying information indicative of the data loss via the user interface.

7. The computer-implemented method of claim 1, wherein monitoring operation of the application in the second region of the cloud environment includes:
   detecting one or more errors during operation of the application in the second region of the cloud environment.

8. The computer-implemented method of claim 7, wherein monitoring operation of the application in the second region of the cloud environment further includes:
   determining a condition of the application in the second region at least based on the detected errors; and
   displaying the determined condition of the application in the second region via a user interface.

9. The computer-implemented method of claim 7, further comprising:
   determining a number of detected errors;

comparing the number of detected errors with a predetermined threshold; and in response to determining that the number of detected errors exceed the predetermined threshold, executing a failback of the application to the first region of the cloud environment.

10. The computer-implemented method of claim 7, further comprising:

determining whether at least one of the detected errors is a critical error; and in response to determining that at least one of the detected errors is a critical error, executing a failback of the application to the first region of the cloud environment.

11. A computer system comprising:

a data storage device storing processor-readable instructions; and a processor operatively connected to the data storage device and configured to execute the instructions to perform operations that include:

determining one or more cross-regional dependencies and traffic flow of an application in a first region of a cloud environment, wherein the one or more cross-regional dependencies include a dependency of the application in the first region of the cloud environment to one or more applications in at least one other region of the cloud environment;

determining a risk score associated with performing failover of the application to a second region of the cloud environment at least based on the determined one or more cross-regional dependencies and traffic flow of the application;

comparing the determined risk score with a predetermined risk score;

as a result of determining that the determined risk score is lower than the predetermined risk score, performing failover of the application to the second region of the cloud environment;

isolating the second region of the cloud environment from the first region of the cloud environment for a predetermined period of time; and monitoring operation of the application in the second region of the cloud environment during the predetermined period of time.

12. The computer system of claim 11, wherein performing failover of the application to the second region of the cloud environment includes:

establishing the determined one or more cross-regional dependencies and traffic flow of the application in the second region of the cloud environment.

13. The computer system of claim 11, wherein monitoring operation of the application in the second region of the cloud environment includes:

determining whether the application is dependent on resources provided by regions of the cloud environment other than the second region of the cloud environment.

14. The computer system of claim 11, wherein performing failover of the application to the second region of the cloud environment includes:

displaying, via a user interface, information indicating progress of the failover of the application to the second region of the cloud environment.

15. The computer system of claim 14, wherein performing failover of the application to the second region of the cloud environment further includes:

determining a start time based on a time of initiation of the failover of the application to the second region of the cloud environment and a time of completion of the failover of the application to the second region of the cloud environment;

determining a duration of the failover based on the start time and the time of completion; and displaying the duration via the user interface.

16. The computer system of claim 14, wherein performing failover of the application to the second region of the cloud environment includes:

determining data loss based on a state of the application prior to failover of the application to the second region of the cloud environment and a state of the application after failover of the application to the second region of the cloud environment; and displaying information indicative of the data loss via the user interface.

17. The computer system of claim 11, wherein monitoring operation of the application in the second region of the cloud environment includes:

detecting one or more errors during operation of the application in the second region of the cloud environment;

determining a condition of the application in the second region at least based on the detected errors; and displaying the determined condition via a user interface.

18. The computer system of claim 17, wherein the operations further include:

determining a number of detected errors;

comparing the number of detected errors with a predetermined threshold; and in response to determining that the number of detected errors exceed the predetermined threshold, executing a failback of the application to the first region of the cloud environment.

19. The computer system of claim 17, wherein monitoring operation of the application in the second region of the cloud environment further includes:

determining whether at least one of the detected errors is a critical error; and in response to determining that at least one of the detected errors is a critical error, executing a failback of the application to the first region of the cloud environment.

20. A computer-implemented method for testing failover comprising:

determining one or more cross-regional dependencies and traffic flow of an application in a first region of a cloud environment, wherein the one or more cross-regional dependencies include a dependency of the application in the first region of the cloud environment to one or more applications in at least one other region of the cloud environment;

determining a risk score associated with performing failover of the application to a second region of the cloud environment at least based on the determined one or more cross-regional dependencies and traffic flow of the application;

comparing the determined risk score with a predetermined risk score;

in response to determining that the determined risk score is lower than the predetermined risk score, performing failover of the application to the second region of the cloud environment;

displaying, via a user interface, information indicating progress of the failover of the application to the second region of the cloud environment;

isolating the second region of the cloud environment from the first region of the cloud environment for a predetermined period of time;
monitoring operation of the application in the second region of the cloud environment during the predetermined period of time; and
displaying, via the user interface, information indicating the monitored operation of the application in the second region of the cloud environment during the predetermined period of time.

* * * * *